No. 814,920. PATENTED MAR. 13, 1906.
U. G. RUSSELL.
WINDOW VENTILATOR.
APPLICATION FILED DEC. 20, 1904.
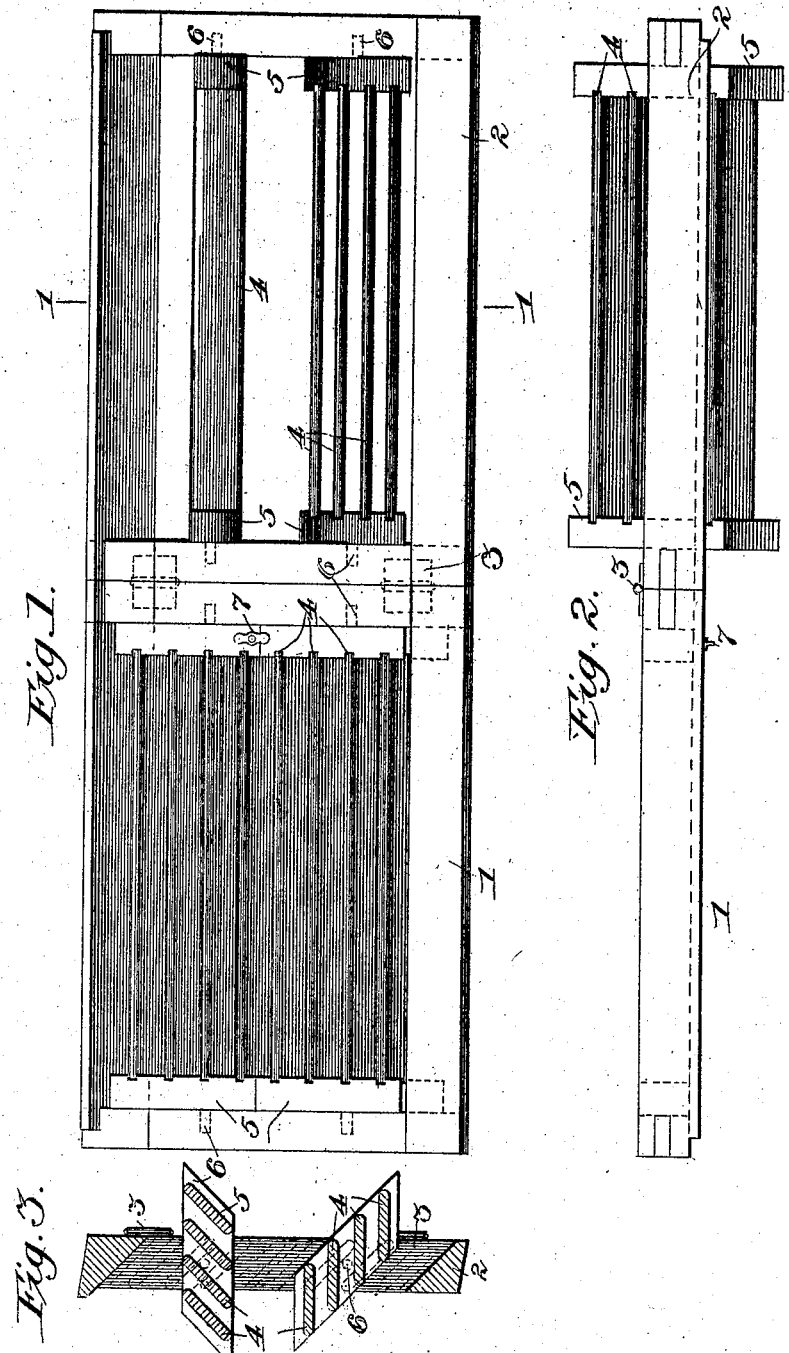

UNITED STATES PATENT OFFICE.

ULYSSES GRANT RUSSELL, OF MARYSVILLE, KANSAS.

WINDOW-VENTILATOR.

No. 814,920. Specification of Letters Patent. Patented March 13, 1906.

Application filed December 20, 1904. Serial No. 237,719.

*To all whom it may concern:*

Be it known that I, ULYSSES GRANT RUSSELL, a citizen of the United States, residing at Marysville, in the county of Marshall and State of Kansas, have invented certain new and useful Improvements in Window-Ventilators, of which the following is a specification.

My invention relates to window-ventilators; and its object is to provide such a structure which is particularly simple, durable, and efficient and which is intended to occupy the space in an open window, as the space below a raised sash, and is so constructed as to admit of a maximum passage or circulation of air when the parts thereof are in one position and effectually exclude the entrance through the window of rain, snow, or the like when the parts are in a second position, while admitting of a more restricted passage or circulation of air.

The invention comprises the combination and arrangement of component parts to be hereinafter described, and particularly pointed out in the claims.

The invention is susceptible of various embodiments, and the accompanying drawings illustrate, and I shall hereinafter describe in connection therewith, what is now conceived to be a preferable exemplification of the same.

In the drawings, Figure 1 is a front elevation of the ventilator. Fig. 2 is a plan view of the same; and Fig. 3 is a cross-sectional view on the line 1 1, Fig. 1.

The invention includes generally a main frame and sections movably mounted therein, each including a plurality of slats, which are moved bodily when the section of which they constitute a part is shifted in the main frame.

In the illustrated exemplification of the invention the main frame is of rectangular shape, so as to fit within the ordinary window-casing in the space provided by raising the lower window-sash and is illustrated as formed of two parts or sections 1 2, suitably hinged together, as at 3. The movable sections are mounted within the openings in the parts 1 2 and are so constructed that in one position thereof the passage of rain, snow, or the like through the window-opening will be effectually prevented and a restricted space provided at the same time for air circulation, while in a second position of the sections a relatively large unobstructed space will be provided for the circulation of air.

In the exemplification of my invention shown in the accompanying drawings each movable section includes a plurality of slats 4, which are held at their ends in end plates or bars 5. The plates or bars 5 are intended to fit snugly within the openings in the main frame and are provided with pintles or studs 6, finding bearings in the walls of the opening in the main frame and upon which the movable sections are intended to be turned.

The movable sections are preferably arranged in pairs, and the members of each pair have complemental obliquely-disposed ends, which abut against each other when the sections occupy their vertical positions. The slats 4 of each section are preferably equidistantly spaced and disposed in an oblique position in a similar manner to the slats of the ordinary shutter, so as to effectually exclude rain, snow, or the like, while admitting of a restricted passage of air when the sections occupy their vertical positions. If a greater circulation of air is desired through the window-opening, one or both of the sections are intended to be turned into a substantially horizontal position, as shown in Fig. 3.

For the purpose of retaining the movable sections locked in their vertical positions a suitable locking-plate 7 is preferably associated with each pair of said sections, said plate extending across the adjacent ends of the members of each pair upon the inner faces of the same and being movably secured to one of the sections, as by a pivotal connection. By reason of the sectional construction of the main frame the insertion and removal of the same into the guideway for the ordinary sash is greatly facilitated.

The construction and operation of my invention will be readily understood upon reference to the foregoing description and accompanying drawings, and it will be appreciated that the parts and combinations recited may be varied within a wide range without departing from the spirit and scope thereof.

Having thus described the invention, what is claimed as new, and desired to be secured by Letters Patent, is—

1. As an article of manufacture, a window-ventilator, comprising a main frame having two openings arranged side by side therein, a pair of coacting sections mounted in each opening, said sections including end plates and cross-slats rigidly mounted in the plates, and pintles projecting from said plates substantially centrally of the same, and finding bearings in the side walls of the main frame.

2. As an article of manufacture, a window-ventilator comprising a main frame having two openings arranged side by side therein, a pair of coacting sections mounted in each opening, said sections including end plates and cross-slats equidistantly spaced and rigidly mounted in the end plates, the slat at the end of each section coacting with the adjacent section being so spaced that the distance between the adjacent slats of the two sections will be substantially the same width, when the sections are in closed position, as the distance between the remaining slats of each section, whereby when the sections are closed the same present a unitary or uniform appearance.

In testimony whereof I have signed my name to this specification in the presence of two subscribing witnesses.

ULYSSES GRANT RUSSELL.

Witnesses:
MARTIN W. SANDERSON,
FANNIE B. COLE.